United States Patent [19]

Kahle et al.

[11] Patent Number: 4,687,025
[45] Date of Patent: Aug. 18, 1987

[54] SINGLE-CONTROL MIXING VALVE

[75] Inventors: Dieter Kahle, Iserlohn; Jürgen Humpert, Hemer; Manfred Pawelzik, Soest, all of Fed. Rep. of Germany

[73] Assignee: Friedrich Grohe Armaturenfabrik GmbH & Co., Hemer, Fed. Rep. of Germany

[21] Appl. No.: 751,774

[22] Filed: Jul. 2, 1985

[30] Foreign Application Priority Data

Jul. 3, 1984 [DE] Fed. Rep. of Germany ....... 3424435
Feb. 2, 1985 [DE] Fed. Rep. of Germany ....... 3503583

[51] Int. Cl.$^4$ .......................................... F16K 11/078
[52] U.S. Cl. .......................... 137/625.17; 137/625.4; 137/636.2
[58] Field of Search ............... 137/636.4, 636, 625.41, 137/625.4, 614.17, 614.18, 625.17, 636.3, 636.2

[56] References Cited

FOREIGN PATENT DOCUMENTS

1550060 3/1966 Fed. Rep. of Germany .
1759520 12/1976 Fed. Rep. of Germany .
3043089 3/1979 Fed. Rep. of Germany .
2739154 6/1981 Fed. Rep. of Germany .
3137774 3/1983 Fed. Rep. of Germany .
3219574 12/1983 Fed. Rep. of Germany ... 137/625.4

Primary Examiner—Alan Cohan
Assistant Examiner—John A. Rivell
Attorney, Agent, or Firm—Karl F. Ross; Herbert Dubno

[57] ABSTRACT

A mixing valve has a base plate adapted to be fixedly mounted on a base fitting and a housing sleeve centered on an axis, mounted on the base plate for rotation about the axis, and formed with a radially open window. A stationary valve plate is fixed on the base plate inside the sleeve and formed with at least two incoming liquid ports and one outgoing water port spaced therefrom. A movable valve plate flatly sitting on the stationary plate inside the sleeve is formed with a chamber alignable with the ports therein. This movable plate is angularly and radially displaceable relative to the axis so the chamber variously overlaps and interconnects the ports. A control member fixed inside the sleeve to the movable valve plate is pivoted on the inner end of a control member also pivoted on the sleeve and having an outer end projecting radially from the sleeve through the window. The sleeve has a lower end rotatably mounted on the base plate and an internally threaded upper end. A holddown ring is threaded in the upper sleeve end and bears axially downward on the member and valve plates.

19 Claims, 13 Drawing Figures

SINGLE-CONTROL MIXING VALVE

FIELD OF THE INVENTION

The present invention relates to a mixing valve. More particularly this invention concerns such a valve having a single control that is used to vary both volume and temperature of flow.

BACKGROUND OF THE INVENTION

A single-control valve is connected to both the hot- and cold-water feed lines and typically has an arm projecting from the valve housing and that is moved in one manner, normally angularly, to control the temperature of the water coming out of a faucet or other fitting connected to the valve and in another manner, normally up and down, to determine the volume of flow. Such a valve can also be used as a flow splitter or other type of mixing valve, in which case the connections are switched around with what would normally be connected to the two incoming lines connected to the two places the flow is to be split between and what is normally connected to the outgoing line connected to the source whose flow is to be split.

German patent document 1,550,060 filed Mar. 24, 1966 by R. G. Parkison describes such an arrangement having a stationary valve plate formed with a large-diameter outgoing-water port and, spaced therefrom, separate smaller hot- and cold-water incoming ports. A movable plate sitting atop this stationary plate has a single large chamber or port and this movable plate can be twisted angularly so that this chamber can overlap all three of the ports for mixing, can interconnect one of the outgoing ports with the incoming port for pure hot- or cold-water flow, or can overlap only the outgoing port for no flow. Similarly radial shifting of the movable valve plate varies the flow cross sections of the ports and thereby determines the volume/time rate of flow.

In this arrangement the movable valve plate is nonrotatable in an upper valve member that can rotate about the axis. A control lever is pivoted in the upper member and passes out through a cap secured to it, so that as this lever is raised and lowered to shift the movable plate radially it tips the entire cap, which must be made a fairly loose fit. When the lever is swung to the side the cap must similarly follow its movement. Thus the arrangement is fairly bulky due mainly to the size of the cap.

In German patent document 3,137,774 filed Sept. 23 1981 by W. P. Herring a similar such arrangement is shown, but where instead of a cap the lever projects out of a large hole in the top of the system. Otherwise this arrangement functions identically to that of Parkison. This hole is a trap for dirt and is generally unsightly.

Another arrangement described in German Pat. No. 1,759,520 filed May 10, 1968 by F. Bayer has a vertically displaceable valve element controlled by a lever projecting through a window in the side of the valve housing. This arrangement is quite tall and is particularly difficult to install, remove, and service.

Further similar such devices can be seen in U.S. Pat. Nos. 2,503,881, 2,989,985, 3,035,612, and 3,168,112 as well as in the other references cited in the above-discussed patent documents.

OBJECTS OF THE INVENTION

It is therefore an object of the present invention to provide an improved mixing valve.

Another object is the provision of such a mixing valve which overcomes the above-given disadvantages, that is which is of compact and neat construction and which is easy to install, remove, and service.

SUMMARY OF THE INVENTION

A mixing valve according to the invention has a base plate adapted to be fixedly mounted on a base fitting and a housing sleeve centered on an axis, mounted on the base plate for rotation about the axis, and formed with a radially open window. A stationary valve plate is fixed on the base plate inside the sleeve and is formed with at least two incoming liquid ports and one outgoing water port spaced therefrom. A movable valve plate flatly sitting on the stationary plate inside the sleeve is formed with a chamber alignable with the ports therein. This movable plate is angularly and radially displaceable relative to the axis so the chamber variously overlaps and interconnects the ports. A control member fixed inside the sleeve to the movable valve plate is pivoted on the inner end of a control member also pivoted on the sleeve and having an outer end projecting radially from the sleeve through the window.

This sleeve has a lower end rotatably mounted on the base plate and an internally threaded upper end and the valve has a holddown ring threaded in the upper sleeve end and bearing axially downward on the member and valve plates and a housing part engaged in the sleeve axially between the holddown ring and the control member and provided with an extension fitting snugly in the window and a pivot carrying the inner end of the control lever. Normally at least the base plate, the sleeve, and the ring are made of metal for maximum ruggedness.

According to a feature of this invention the housing part is provided with a radially extending guide in which the control member is radially displaceable. Alternately the housing part is provided offset from the axis with an axially extending guide pin and the control member is formed with a radially extending guide groove receiving the pin. An interfitting groove and key on the part and member could also be used for radial guiding.

The control member according to this invention is provided with a loose pivot connected to the inner end of the arm and typically formed by an axially elongated slot in the lever and a pin fixed in the control member. The inner end of the lever has cylindrically arcuate portions centered on the pivot of the housing part and snugly engaging the projection in the window so that the inner end is a snug fit in the projection.

In accordance with further features of the invention the base plate is formed offset from the axis with at least two mounting holes and is provided with screws extending through these holes and adapted to be secured in the base fitting. The housing part and holddown ring are formed with holes aligned with the holes of the base plate so that access to these screws is possible through the assembled valve. In addition the valve has a cap covering the upper end of the sleeve above the ring and having mounting pins engaged in the holes of the housing part.

The lower end of the sleeve is provided with a radially inwardly projecting rim engaged underneath the base plate and formed with a relatively wide radially inwardly open notch and the base plate is formed with a rib engaging in the notch and thereby limiting rotation of the sleeve on the base plate. In addition the base plate has offset from the axis a plurality of radially upwardly projecting tabs or formations and the stationary valve plate has respective complementarily arranged recesses receiving these formations and rotationally coupling the stationary valve plate and base plate. The formations can be bent up in the field, or preformed in the base plate The sleeve in accordance with this invention has two such generally diametrally opposite such windows and the housing part has two such extensions snugly received in the windows. The lever is formed of a shaft journaled in the two projections at the windows, an inner arm projecting laterally from the shaft inside the sleeve and operatively engaged with the control member, and an outer arm extending generally perpendicularly outside the sleeve from the shaft. Normally the windows are radially opposite so the shaft is diametral of the axis and the lever has two such arms having joined-together outer ends and inner ends connected to the shaft at the respective windows. In this arrangement the housing part is formed by an upper holddown part lying mainly between the windows and the holddown ring, and a lower holddown part engaged axially between the upper part and the control member. These two holddown parts together form a journal at each window and the shaft is rotatably supported at the journals thus formed. The control member has a notch opening axially toward the shaft and the inner arm of the shaft carries a pivot engaged in this notch and thereby linking the lever and the movable valve plate.

The outer arms, shaft, and inner arm are unitarily formed as a casting with each other and with a pivot rod extending parallel to the shaft and engaged in the notch of the control member. In this case the shaft is formed with ridges radially outwardly engaging the journals and centering the lever on the sleeve and the inner arm is multiply ribbed, preferably of double T-section. This type of casting is very robust.

It is also within the scope of this invention to form the entire lever of a single bent piece of rod which has oppositely directed ends forming the pivot. Such construction is inexpensive and durable.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIG. 7 is a section like FIG. 1 through a variant on mixing valve of FIGS. 1 through 6;

SPECIFIC DESCRIPTION

As seen in FIGS. 1 through 6 a single-control mixing valve 1 according to this invention is secured atop a base fitting 2, here a faucet, and is generally centered on an upright axis 15. The valve 1 has a base plate 11 formed with a pair of diametrically opposite holes 112 centered on a circle 111 and through which respective screws 21 are secured in the fitting 2. This base plate 11 is formed in back (to the left in FIGS. 1, 2, 5, and 6 and up in FIG. 4) of the axis 15 with a large-diameter throughgoing hole or port 116 and in front (to the right in FIGS. 1, 2, 5, and 6 and down in FIG. 4) of this axis with two smaller ports 117, all lined with O-ring seals 34 and aligned on the fitting 2 with respective ports which communicate with the faucet (see 23 in FIG. 7) and with the incoming hot- and cold-water lines. In addition this plate 11 has three angularly equispaced upturned regions 114 at its outer edge. As seen in FIG. 7, the fitting 2 is provided with a single threaded stem 22 for one-hole installation.

A stationary ceramic valve plate 30 has a polished upper surface lying in a plane perpendicular to the axis 15 and a lower surface bearing snugly downward atop the plate 11 and its seals 34. This plate 30 is formed on its outer edge with three angularly equispaced cutouts 301 into which the bent-up tabs 114 of plate 11 fit so as to angularly lock these two parts together. In addition the plate 30 is formed with a rear mixed-water port 33 and front hot- and cold-water incoming ports 32 aligned with the respective ports 116 and 117 in the plate 11.

A ceramic and movable valve plate 3 formed with a single large cutout or chamber 35 has a polished lower surface bearing snugly down on the upper surface of the stationary valve plate 30. The movable plate 3 can pivot as will be described below through about 90° relative to the axis 15 on the plate 30, and can also be shifted radially of this axis 15 also. As is standard, the angular position determines the temperature of the outgoing water by determining the mix ratio, and the radial position determines the flow cross section of the valve 1 and, therefore, the volume of flow through it.

A main valve member 31 fits securely atop and is fixed by formations 314 to the movable valve plate 3 to upwardly close the chamber 35. In turn, a housing part 14 sits atop this member 31 and bears downward on it, the part 14 being provided with guide surfaces 142 that only allow the member 31 to move radially relative to the part 14. In turn a housing sleeve 12 formed with a radially forwardly open window 121 has a bent-under lip 122 engaged underneath a slide washer 115 provided on the rim of the base plate 11 so that this sleeve 12 can rotate about the axis 15 on the plate 11. A 90° notch 124 cut in the rim 122 receives a rib 113 in the back of the plate 11 (FIG. 2) to limit the relative angular displacement of the assembly formed by the valve plate 3, member 31, part 14, ring 13, sleeve 12, and cap 132. At the same time the part 14 has a forward extension 144 which fits snugly in and in facts lines a square forwardly open window 121 formed in the sleeve 12, effectively preventing the sleeve 12 from rotating relative to this part 14.

Figure 1:
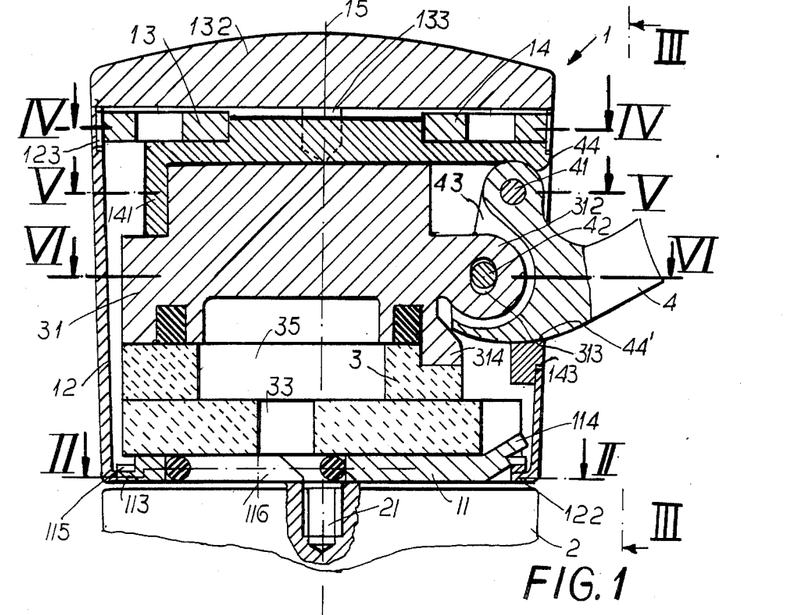
FIG. 1 is a large-scale axial section through the mixing valve according to this invention.
Figure 2:
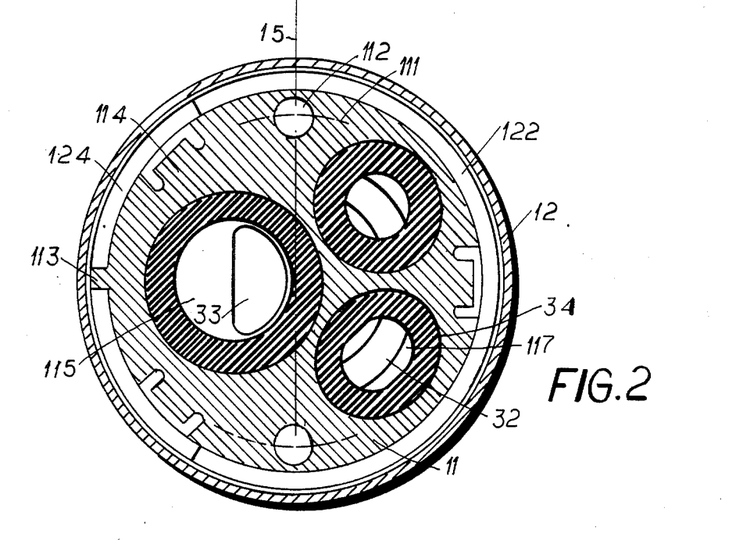
FIGS. 2, 3, 4, 5, and 6 are sections taken along respective lines II—II, III—III, IV—IV, V—V, and VI—VI of FIG. 1.
Figure 3:
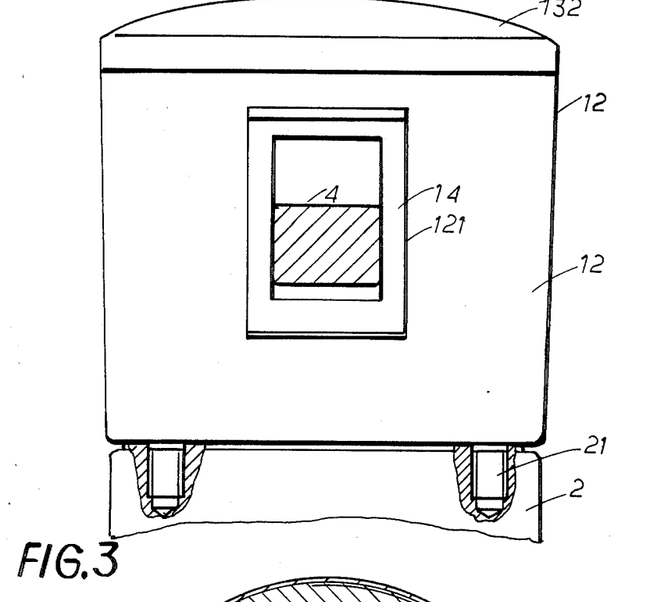
Figure 4:
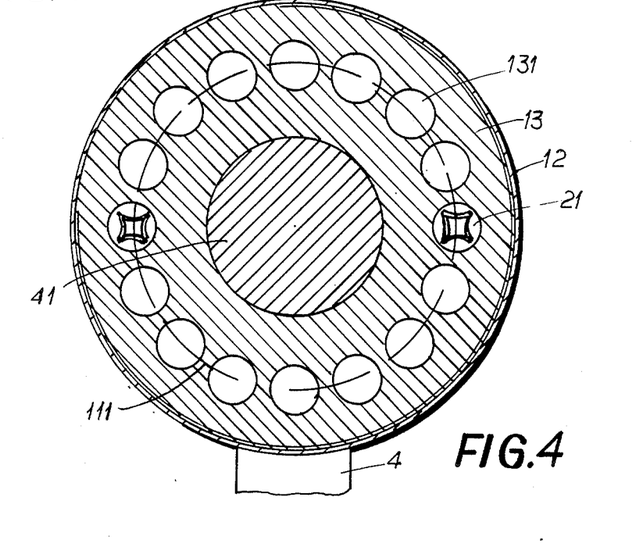
Figure 5:
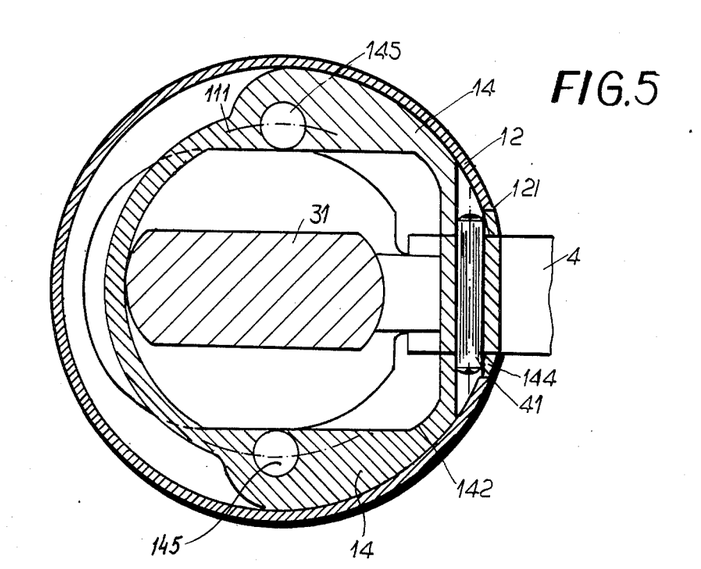
Figure 6:
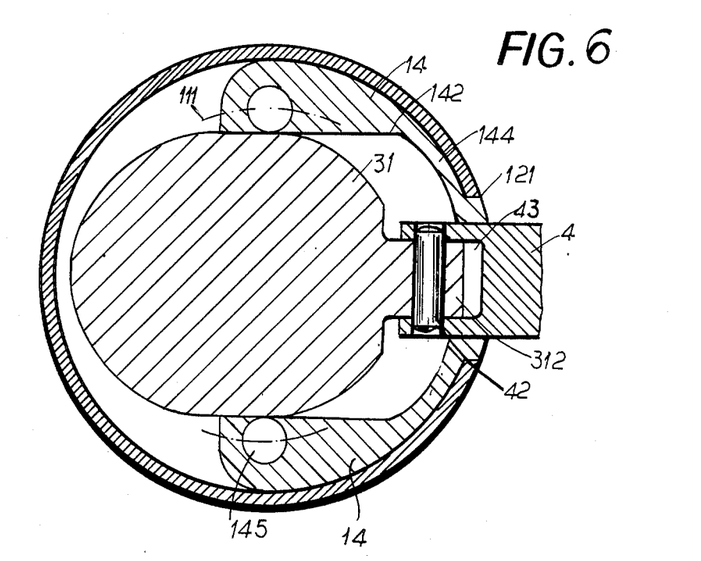
Figure 8:
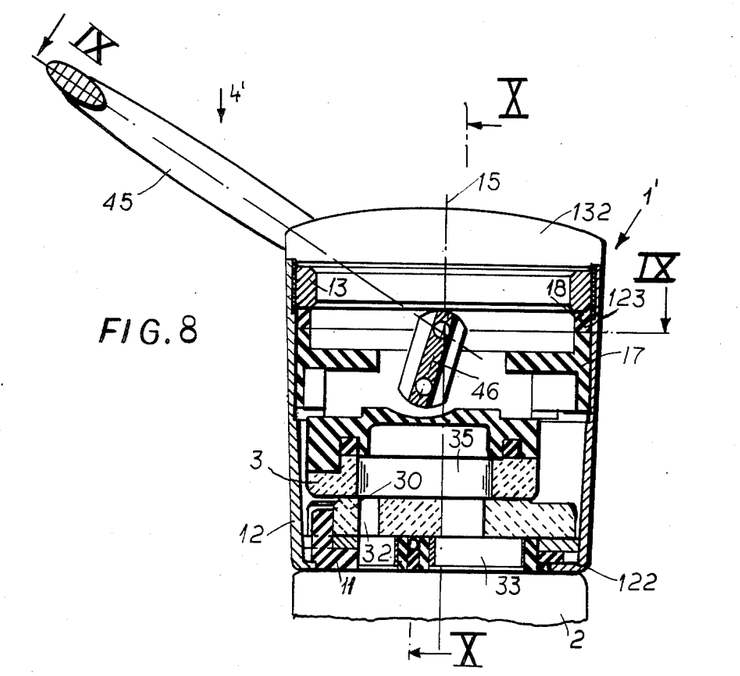
FIG. 8 is an axial section through yet another mixing valve according to the invention.
Figure 9:
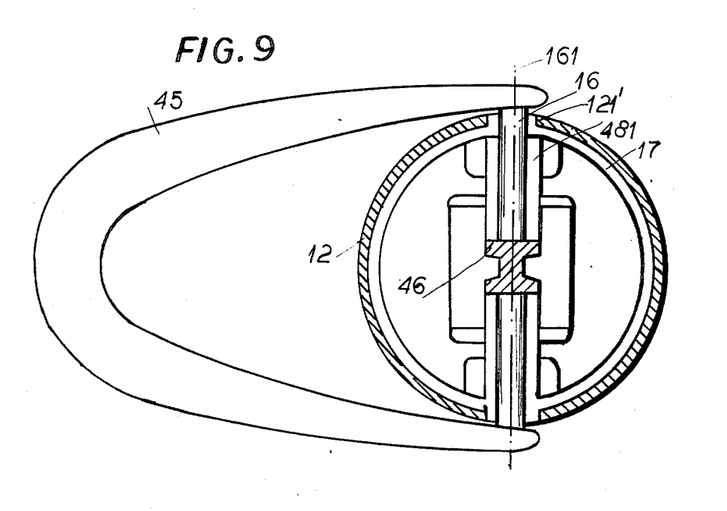
FIGS. 9 and 10 are sections taken respectively along lines IX—IX and X—X of FIG. 8.
Figure 10:
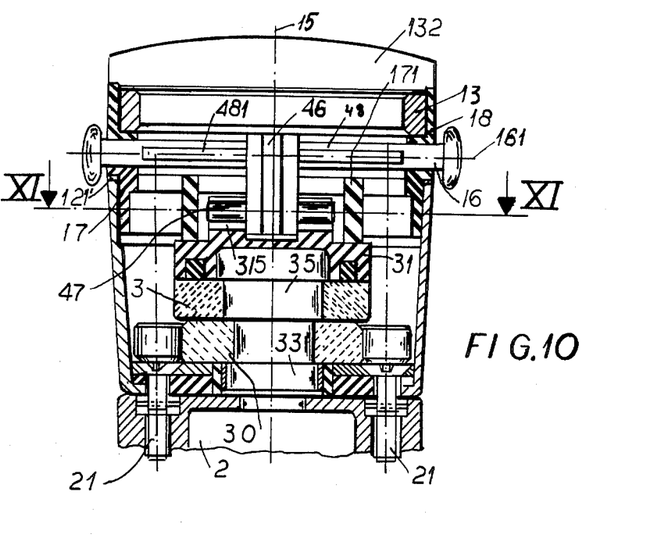
Figure 11:
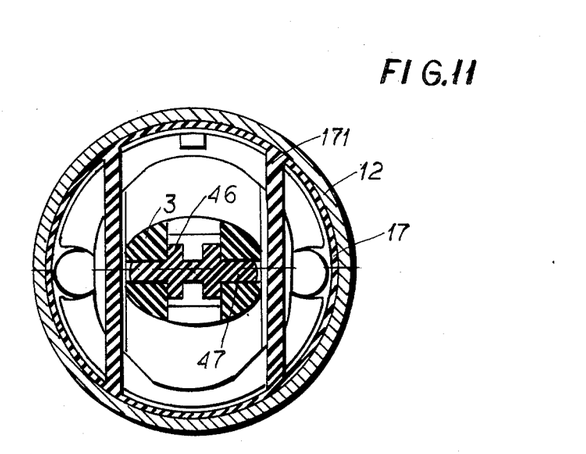
FIG. 11 is a section taken along line XI—XI of FIG. 10.
Figure 12:
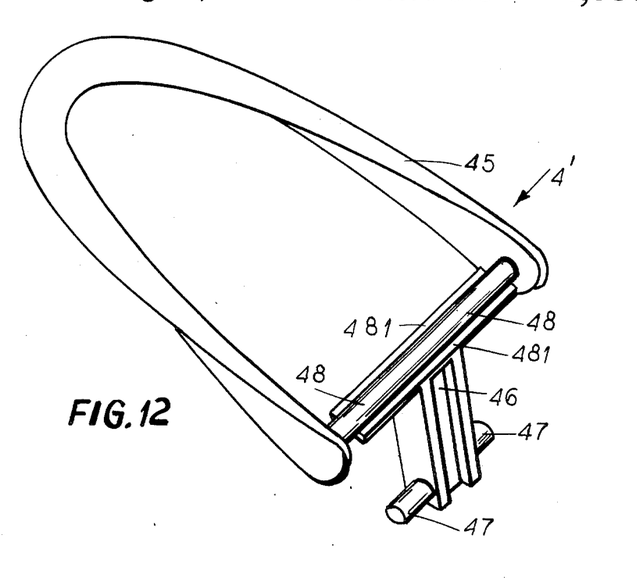
FIG. 12 is a perspective view of the control lever of FIGS. 8 through 11.

A ring 13 is threaded at 123 inside the top rim of the sleeve 12 and bears axially downward on the part 14, thereby axially pressing the plates 3 and 30 together. This ring 13 is formed on the circle 111 with as shown in FIG. 4 an annular array of angularly equispaced holes 131 that can be aligned with holes 145 formed in the part 14 in line with the screws 21, granting access to these screws 21. A mainly decorative cover or cap 132 has a pair of pins 133 fitting into the holes 131 of the ring 13 and the holes 145 of the part 14 to upwardly close the valve 1. This style of mounting assures proper positioning of this cap 132 which can carry indicia indicating how to use the valve and at the same time prevents the ring 13 from loosening.

A control lever 4 has an inner end 44 pivoted on a pin 41 carried on the front of the part 14 and extending tangent to the axis 15, and is also formed with a pocket 43 which receives a lug 312 of the member 31. Another pivot pin 42 parallel to but below the pin 41 has its outer ends seated in the opposite sides of the pocket 43 and passes through a vertically elongated hole 313 formed in the lug 312. This lever 4 extends out of the sleeve 12 through the window 121 and snugly engages the forward projection 144 of the part 14. Thus this lever 4 can be raised and lowered to radially displace the plate 3 on the plate 30, and can be swung to the side to pivot the entire assembly 3, 31, 14, 13, 12, and 132 about the axis 15 on the base plate 11 and valve plate 30, thereby controlling temperature and volume of flow from the faucet 23 as is known.

The structure described above is assembled as follows:

First of all the base plate 11 is fitted inside the sleeve 12 on top of its rim 122, and is secured to the fitting 2 by the two screws 21. The stationary valve plate 30 is then positioned on the plate 11 with its large rear port 33 aligned with the rear port 116 and its front ports 32 aligned with the front ports 117 of the plate 11, in which position the bent-up tabs 114 and cutouts 301 align also. Then the movable valve plate 30 is positioned in place atop the plate 30.

An assembly made up of the handle 4 pivoted via the pin 41 on the part 14 and via the pin 42 on the member 31 is then installed by inserting the lever 4 and projection 144 through the window 121, fitting the member 31 to the movable plate 3, and fitting the part 14 atop the member 31. The holddown ring 13 is then threaded into the sleeve 12 to axially push all the core parts 30, 3, 31, and 14 down against the plate 11, and the cover 132 is snapped in place.

It should be noted that removal of the cap 132 allows the screws 21 to be released and the entire assembly removed. Similarly removal of the cap 132 and ring 13 allows the lever assembly 4, 31, 14 to be removed and the two valve plates 3 and 30 replaced. Thus installing, removing, and working on the valve according to this invention is fairly easy.

In addition, the valve according to this invention can be lubricated rather easily simply by injecting the necessary lubricant for the abutting faces of the plates 3 and 3 in through the bores 131 and 145.

In the arrangement of FIG. 7, where the same reference numerals as in FIGS. 1 through 6 are used for identical structure, the radial guiding of the member 31 on the part 14 is effected by an offcenter pin 143 that projects from the part 14 and engages in a radial slot 311 of the member 31. This pin 143 is diametrally opposite the window 121, so that they permit relative radial movement of the member 31 and part 14 while preventing relative rotation. It would also be possible to use a radially extending key or groove and ridge for this angular coupling.

In the arrangement of FIGS. 8 through 12 reference numerals identical to those of FIGS. 1 through 6 are used for functionally identical structure.

Here a control lever 4' is provided having an outer U-shaped portion 45 whose ends are traversed by an actuating rod 48 having outer ends formed as cylindrical bearing parts 16 and an inner portion formed with stiffening ribs 481. A lower holddown piece 17 has transverse ribs 171 that press down the member 31 and an upper holddown ring 18 is engaged between this piece 17 and the ring 13. The pieces 17 and 18 together project outward through windows 121' formed at diametrally opposite locations relative to a transverse axis 161 in the sleeve 12 and these pieces 17 and 18 together form the journals for the bearing parts 16 of the shaft 48.

Extending radially downward from the shaft 48 and integral therewith is an actuating bar 46 of double T-section and provided on its lower end with an actuating pin 47 received in a groove 315 formed in the top of the member 31. Thus raising or lowering of the loop 45 of the handle 4' will radially displace the member 31 and slidable valve plate 3, while swinging from side to side will pivot everything but the plates 11 and 30 as in the arrangement of FIGS. 1 through 6.

Figure 13:
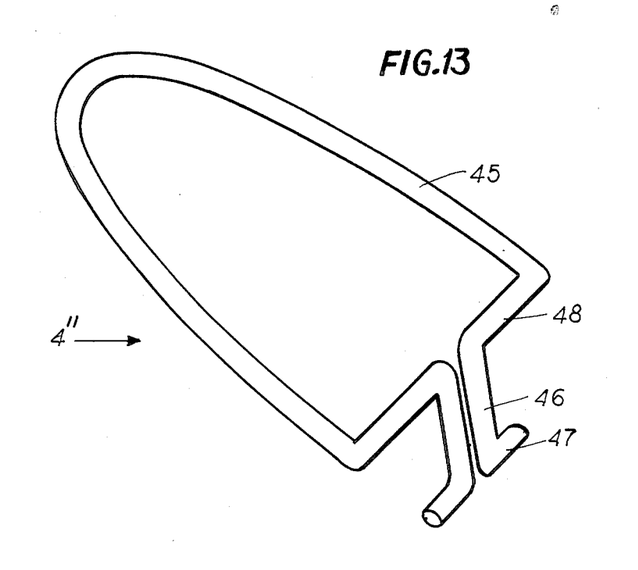
FIG. 13 is a perspective view of a variant on the lever control of FIGS. 8 through 11.

FIG. 13 shows another lever 4" which functions identically to the lever 4' of FIGS. 8 through 12, but which is not formed as a zinc-alloy casting but of a single bent piece of rod having opposite ends forming the pivot 48. Such construction can be somewhat springy to prevent overstressing the parts 31 and 14 which are normally made of a synthetic resin.

This system is put together by fitting the sleeve 12 and plates 11 and 3 together and then screwing them to the base fitting 2 as in the FIGS. 1–6 arrangement. Then the upper valve plate 3 and the member 31 are fitted in, and the holddown piece 17 forming the lower half of the bearing for the parts 16 is mounted in place, with some deformation to snap the projections on this piece 17 into the windows 121'. The handle 4' is then mounted in place, followed by the upper holddown ring 18, the ring 18, and the cap 132.

Alternately of course it is possible to assemble the entire valve 1', and to subsequently drop in the screws 21 and secure it in place atop the fitting 2 therewith.

It is also possible to use the valve according to this invention as a flow-splitting unit, in which case the flow enters via the large port 33 and is split between the two ports 32.

We claim:
1. A mixing valve comprising:
 a base plate adapted to be fixedly mounted on a base fitting;
 a sleeve centered on an axis, having a lower end rotatably mounted on the base plate for rotation about the axis, having an internally threaded upper end, and formed with a radially open window;
 a stationary valve plate fixed on the base plate inside the sleeve and formed with at least two incoming liquid ports and one outgoing liquid port spaced therefrom;
 a movable valve plate flatly sitting on the stationary plate inside the sleeve and formed with a chamber alignable with the ports therein, the movable plate being angularly and radially displaceable relative to the axis so the chamber variously overlaps and interconnects the ports;

a control member fixed inside the sleeve to the movable valve plate;

a holddown ring threaded in the upper sleeve end and bearing axially downward on the member and valve plates;

a housing part engaged in the sleeve axially between the holddown ring and the control member and provided with an extension fitting snugly in the window and a pivot defining a pivot axis perpendicular to the axis of rotation of the sleeve; and a control lever having an inner end pivoted on the control member about another pivot axis perpendicular to the axis of rotation of the sleeve and also pivoted on the housing part about its respective axis and an outer end projecting radially from the sleeve through the extension.

2. The mixing valve defined in claim 1 wherein the housing part is provided with a radially extending guide in which the control member is radially displaceable.

3. The mixing valve defined in claim 1 wherein the housing part is provided offset from the axis of rotation of the sleeve with an axially extending guide pin and the control member is formed with a radially extending guide groove receiving the pin.

4. The mixing valve defined in claim 1 wherein the control member is provided with a loose pivot connected to the inner end of the lever.

5. The mixing valve defined in claim 4 wherein the inner end has cylindrically arcuate portions centered on the pivot of the housing part and snugly engaging the extension in the window, whereby the inner end is a snug fit in the extension.

6. The mixing valve defined in claim 1 wherein the base plate is formed offset from the axis with at least two mounting holes and is provided with screws extending through these holes and adapted to be secured in the base fitting, the housing part and holddown ring being formed with holes aligned with the holes of the base plate, whereby access to these screws is possible through the assembled valve.

7. The mixing valve defined in claim 6, further comprising
a cap covering the upper end of the sleeve above the ring and having mounting pins engaged in the holes of the housing part.

8. The mixing valve defined in claim 1 wherein the lower end of the sleeve is provided with a radially inwardly projecting rim engaged underneath the base plate and formed with a relatively wide radially inwardly open notch, the base plate being formed with a rib engaging in the notch and thereby limiting rotation of the sleeve on the base plate.

9. The mixing valve defined in claim 1 wherein the base palte has offset from the axis of rotation of the sleeve a plurality of radially upwardly projecting formations and the stationary valve plate has respective complementarily arrange recesses receiving these formations and rotationally coupling the stationary valve plate and base plate.

10. The mixing valve defined in claim 1 wherein the sleeve has two generally diametrically opposite windows and the housing part has two extensions snugly received in the windows, the lever including
a shaft journaled in the two projections at the windows,
an inner arm projecting laterally from the shaft inside the sleeve and operatively engaged with the control member, and
an outer arm extending generally perpendicularly outside the sleeve from the shaft.

11. The mixing valve defined in claim 10 wherein the windows are radially opposite so the shaft is diametral of the axis and the lever has two arms having joined-together outer ends and inner ends connected to the shaft at the respective windows.

12. The mixing valve defined in claim 10 wherein the housing part is formed by:
an upper holddown part lying mainly between the windows and the holddown ring; and
a lower holddown part engaged axially between the upper part and the control member, the two holddown parts together forming a journal at each window, the shaft being rotatably supported at the journals thus formed.

13. The mixing valve defined in claim 12 wherein the control member has a notch opening axially toward the shaft and the inner arm of the shaft carries a pivot engaged in this notch and thereby linking the lever and the movable valve plate.

14. The mixing valve defined in claim 13 wherein the outer arms, shaft, and inner arm are unitarily formed with each other and with a pivot rod extending parallel to the shaft and engaged in the notch of the control member.

15. The mixing valve defined in claim 12 wherein the shaft is formed with ridges radially outwardly engaging the journals and centering the lever on the sleeve.

16. The mixing valve defined in claim 12 wherein the inner arm is multiply ribbed.

17. The mixing valve defined in claim 12 wherein the entire lever is formed of a single bent piece of rod.

18. The mixing valve defined in claim 17 wherein the bent rod has oppositely directed ends forming the pivot.

19. A mixing valve comprising:
a base plate adapted to be fixedly mounted on a base fitting;
a sleeve centered on an axis, having a lower end rotatably mounted on the base plate for rotation about the axis, having an internally threaded upper end, and formed with a radially open window;
a stationary valve plate fixed on the base plate inside the sleeve and formed with at least two incoming liquid ports and one outgoing liquid port spaced therefrom;
a movable valve plate flatly sitting on the stationary plate inside the sleeve and formed with a chamber alignable with the ports therein, the movable plate being angularly and radially displaceable relative to the axis so the chamber variously overlaps and interconnects the ports;
a control member fixed inside the sleeve to the movable valve plate;
a holddown ring threaded in the upper sleeve end and bearing axially downward on the member and valve plates; and
a control lever having an inner end separately pivoted about respective pivot axes perpendicular to the axis of rotation of the sleeve and fixed respectively on the control member and the sleeve and an outer end projecting radially from the sleeve through the window.

* * * * *